United States Patent Office 3,548,048
Patented Dec. 15, 1970

3,548,048
METHOD OF PRODUCING POLYMERIC ARTICLES RESISTANT TO FIBRILLATION
James K. Hughes and Jake E. Williams, Bartlesville, Okla., assignors to Phillips Petroleum Company, a corporation of Delaware
No Drawing. Filed May 20, 1968, Ser. No. 730,614
Int. Cl. B29c 17/14
U.S. Cl. 264—147                                    6 Claims

ABSTRACT OF THE DISCLOSURE

A method whereby a fibrillatable polymeric product is rendered resistant to fibrillation by forming said product from a mixture of separate polymer components having different melting points or ranges and heating the product at a temperature below the melting point or range of the highest-melting polymer component and above the melting point or range of the lowest-melting polymer component.

---

This invention relates to a method of making oriented polymeric products having a reduced tendency to fibrillate. In another aspect it relates to such methods whereby products having improved strength and/or durability as a result of their increased resistance to fibrillation (splitting). In still another aspect it relates to an improved method of producing fibrillated material which has been formed by fibrillating orineted film but which resists additional fibrillation.

Polymeric articles of manufacture such as film, ribbons, and pipe which have uniaxial, molecular orientation possess a tendency to split along lines parallel to the direction of orientation. This phenomenon has been used to advantage in making fibrous products from oriented films by initial fibrillation. Sometimes however it is desirable to have an oriented article which is not fibrillated. For example, it is desirable to orinet a package strapping ribbon to increase its longitudinal tensile strength but it is also desirable that the oriented ribbon not fibrillate when subjected to stresses caused by handling of the package and the like.

Fibrillated products have been made using various procedures. A full and complete disclosure of fibrillated products and a method for making same can be found in U.S. Pat. 3,302,501, the disclosure of which is hereby incorporated. With some fibrillated products there is a residual propensity to fibrillate upon subsequent handling and/or fabrication and in these instances the resulting final product may have less than desired abrasion characteristics.

According to this invention it has been found that initial fibrillation of orineted but unfibrillated products and additional (residual) fibrillation of oriented and already fibrillated products is substantially obviated and the abrasion properties of the final product improved by providing an oriented, unfibrillated or oriented, fibrillated product formed from at least two polymer components, at least two of the polymer components having different melting points or ranges, and heating the product for a finite period of time at a temperature between the melting point or range of the highest-melting polymer component(s) and the melting point or range of the lowest melting polymer component(s).

The products of this invention are molded articles formed from at least two polymers having substantially different melting points or ranges, the polymer having the highest melting point or range being oriented and the polymer of the lowest melting point or range being substantially unoriented.

The fibrillated product of this invention is useful as a filtering medium such as for separating solid particles from a liquid, in fabrics, in carpeting, and also as backing for carpeting.

The unfibrillated product of this invention is useful as film or as ribbons of for example ⅛ to 6 inch widths used for strapping on shipping cartons, cotton bales, and the like. The invention is also useful on nonflat articles, e.g. molded articles such as bowls or other containers, pipes, and the like.

Accordingly, it is an object of this invention to provide a new and improved method for producing a fibrillated product.

It is another object of this invention to provide a new and improved method for substantially obviating residual fibrillation ability inherent in some fibrillated products and thereby improving the abrasion characteristics of such products.

Another object is to provide methods for producing oriented products of polymers having reduced tendency to fibrillate.

Other aspects, objects, and the several advantages of this invention will be apparent to those skilled in the art from the following description and appended claims.

Although this invention can be applied to uniaxially, molecularly oriented articles as described, it is especially advantageous in preparing fibrillated films because the films must be highly oriented to permit fibrillation in the first place, but once the desired degree of fibrillation has been effected, further fibrillation is undesirable and can be obviated by this invention.

This invention applies to molded articles such as films and ribbons, i.e., articles having a width to thickness ratio of greater than 1/1, e.g., at least 1.1/1, cylindrical articles such as tubing, conduits, pipe, and other molded articles. The film and ribbons can have a thickness no greater than 0.1 inch and a width greater than 0.15 inch. Suitable molded articles are those formed by injection molding, molding by heating the polymer and then applying a pressure differential to the polymer to force same into a mold (thermoforming, vacuum molding, blow molding), extrusion molding and film casting.

According to this invention articles such as orineted film, pipe, or a fibrillated product are produced in a conventional manner. These articles are made from a physical mixture of at least two polymer components. Each polymer component has a composition different from the remaining component or components and each is composed of one of a homopolymer or homopolymers, a copolymer or copolymers formed from one or more 1-olefins having 2 to 8 carbon atoms per molecule, inclusive, polyamides, and polyesters.

The highest-melting polymer component or components which is to remain oriented are present in the product in a major amount of from about 55 to about 99 weight percent based upon the total weight of the product while the other polymer component or components which is to be melted are present in a minor amount of from about 1 to about 45 weight percent based on the total weight of the product.

At least one of the polymer components in each of the above major and minor amount groups should each have a relatively distinct melting range or point and should each have a crystallinity of at least about 25 percent as determined by a method hereinafter described.

The polymer component(s) present in a major amount in the product should have a melting point (hereinafter defined) substantially greater, e.g., at least about 5° C., preferably from about 5 to about 300° C., than the melting point of the other polymer components. The statement that the polymer present in the major amount should have a melting point at least 5° C. higher than that of the other polymer components also means that there is at least a 5° C. interval between (1) the lowest limit of the melting range(s) of the polymer component(s) present in the major amount and (2) the highest limit of the melting range(s) of the polymer component(s) present in the minor amount.

The thus oriented but unfibrillated or oriented and fibrillated product is heat treated (annealed) in any conventional manner at a temperature below the melting point of the highest-melting polymer component and above the melting point of at least one of the lower melting polymer component(s) for a time sufficient to melt and unorient the at least one lower melting polymer component(s). The time can be at least about 1 second, preferably from about 5 seconds to about 20 minutes. Higher temperatures can be used when short heating times are employed so long as a lower melting polymer is unoriented without substantially unorienting a higher melting polymer. The amount of the lower melting polymer or polymers which are unoriented by the heat treatment of this invention is substantial and should be sufficient to obtain the increased resistance-to-fibrillation results of this invention. Generally, all of the lower melting polymer or polymers that are to be unoriented in accordance with this invention should actually be unoriented by the heat treatment. Because the heat treatment is carried out under no tension, there is no tendency for the crystals of the lower melting polymer or polymers that form on cooling to be or become oriented. The heating can be carried out under any suitable atmosphere which is substantially nondeleterious to the product, e.g. air, steam, inert atmospheres such as nitrogen or argon, mixtures thereof, and the like. The time and temperature at which the heating is carried out are such that at least one of the lower-melting polymer component(s) is softened sufficiently to lose its orientation and the highest-melting polymer component(s) is not substantially softened and does not substantially lose its orientation.

Although the lower-melting polymer component(s) can be present in the amount of from about 1 to about 45 weight percent, it is preferred that from about 5 to about 15 weight percent of lower-melting polymer component(s) be employed for the most pronounced improvement in abrasion characteristics. It is also preferred that the lower-melting polymer component(s) have a tensile strength as determined by ASTM D 638–61T of at least about 2000 p.s.i.

Examples of suitable olefin polymers that can be employed in making the fibrillated product of this invention and their corresponding melting points are as follows:

| Polymer | | Melting point, °C. |
|---|---|---|
| Polymer No.: | | |
| 1 | Low-density polyethylene | 110 |
| 2 | Ethylene/butene-1 copolymer | 125 |
| 3 | High-density polyethylene | 135 |
| 4 | Polypropylene | 165 |
| 5 | Poly(butene-1) | 120 |
| 6 | Poly(pentene-1) | 70 |
| 7 | Poly(3-methylbutene-1) | 300 |
| 8 | Poly(4-methylpentene-1) | 240 |

[1] From Polymer Single Crystals by Phillip H. Geil, Interscience Publishers (1963).

Examples of blends that can be used (using polymer numbers from the above tabulation and reciting the higher-melting component first) are: 4/3, 4/2, 4/1, 4/5, 1/6, 2/6, 3/6, 4/6, 5/6, 7/1, 7/2, 7/3, 7/4, 7/5, 7/6, 8/1, 8/2, 8/3, 8/4, 8/5, 8/6, and 7/8.

Examples of other polymers that can be used in making the fibrillated products of this invention, either in blends with each other or with olefin polymers such as those listed above are:

| Polymer No. | Polymer | Melting[1] point, °C.[1] |
|---|---|---|
| 9 | Nylon 6/6 | 265 |
| 10 | Nylon 6/10 | 228 |
| 11 | Nylon 6 | 220 |
| 12 | Poly(ethylene terephthalate) | 265 |
| 13 | Poly(1,4-cyclohexylenedimethylene terephthalate) | [2] 275; 295 |

[1] Geil, op. cit.
[2] These values reported by manufacturer for two different samples. Differential Scanning Calorimetry analysis of the first sample showed a melting range of 240 to 279° C. with a peak at 268° C.; for the second sample the range was 275 to 299° C. with a peak at 290° C Further examples of blends that can be used are 9/4, 9/2, 9/8, 10/1, 10/3, 11/4, 8/11, 12/4, 9/10, 9/11, 12/10, 12/11, 13/4, 13/8, 13/10, and the like.

The melting points given above fall within the melting ranges of the polymers and are useful in selecting possible blend combinations. Melting points can be determined by the disappearance of birefringence. The melting range (not point) of a polymer as subsequently defined, however, determines a polymer's ultimate suitability in the blend and the proper heat treating temperature. For example, in each case (1) the polymer component(s) to remain oriented after heat treating and (2) the polymer component(s) to be melted by the heat treating can have separated melting ranges, i.e., the lowest point of the melting range(s) of (1) should be at least 5° C. above the highest point of the melting range(s) of (2), irrespective of what the melting points of (1) and (2) are. It should be noted however that it can be possible to have the upper portion of the melting range of a lower melting component overlap the lower portion of the melting range of a higher melting component and to heat treat the polymer mixture at a temperature within this overlap and still obtain the results of this invention, i.e., disorientation of the lower melting component without substantially disorienting the higher melting component.

The physical mixture of the two polymer components employed in this invention can be formed in any conventional manner such as dry mixing pellets of the polymer components, solution blending the polymer components, or any other known technique such as utilizing Banbury mixers, roll mills, plastographs, and the like. A particularly convenient procedure is to dry mix pellets of the polymer components and thereafter feed the resulting mixture of pellets to a conventional film fabricating apparatus such as a melt extrusion apparatus which either produces a polymer film or a polymer tube which can be flattened into the form of a film. Film can also be formed by casting, and pipe or tubing can be formed by extrusion which in itself induces uniaxial orientation. Melt spinning is not included.

In making fibrillated products, the oriented film or ribbon which contains a physical mixture of the polymer components of this invention can be fibrillated in a conventional manner, for example as disclosed in U.S. Patent 3,302,501 or any other conventional fibrillation technique. The film or ribbon to be fibrillated can be any thickness or width susceptible to fibrillation, the minimum thickness being that which forms a self-supporting film and the maximum thickness being dependent primarily only on the capability of the paritcular fibrillation apparatus used, coarser fibers in the final product being obtained when a film thickness of greater than about 2 mils is employed.

The film to be fibrillated is first drawn, i.e. plastically deformed in at least one direction, using draw ratios, i.e. the ratio of the length of the plastically deformed film in the direction of stretching to its original length in that same direction before stretching, of at least 2:1, preferably from about 2:1 to about 25:1, at any temperature below or within the melting range of the highest-melting polymer component present in the film, preferably from about ambient temperature (e.g. about 20° C.)

up to but below the highest melting point in the melting range of the highest-melting polymer component. This drawing or orientation process molecularly orients the polymer molecules in the film and renders the film susceptible to fibrillation, i.e. breaking up into individual fibers or a network of fibers which are integrally joined to one another. This orientation is preserved by rapidly cooling the drawn fiber.

The molecularly oriented film is fibrillated and after fibrillation is heat treated as described above to reduce any residual fibrillatability of the fibrillated product and to improve the abrasion characteristics of the fibrillated product. Oriented articles of other types, e.g. pipe which is oriented by the extrusion process in which it was made, can also be heat treated as described to prevent fibrillation.

The crystallinity of the polymers is calculated from the following relation:

$$\frac{\alpha}{P_c} + \frac{(1-\alpha)}{P_a} = \frac{1}{P}$$

where $\alpha$ is the fractional crystallinity, $P_c$ and $P_a$ are the densities of the crystal and amorphous phases, respectively, and $P$ is the density of the polymer under examination. (M. L. Miller, "The Structure of Polymers," (1966) page 521, Rembold Publishing Co.). The densities of the crystal and amorphous phases used in calculating the crystallinities of the polymers are:

|  | $P_a$ (g./cc.) | $P_c$ (g./cc.) |
|---|---|---|
| Polyethylene [1] | 0.852 | 1.00 |
| Polypropylene [1] | 0.85 | 0.936 |

The melting range of the polymers of this invention can be determined in any conventional manner such as by differential thermal analysis (Trans. J. Plastics Inst., April 1966, page 73, by F. S. Double) using, for example, a commercially available Perkin-Elmer Differential Scanning Calorimeter (DSC). This method, which is widely used in the industry, shows a melting range rather than a sharp melting temperature for the polymers that can be used in the process of this invention. For example, DSC analysis of the ethylene/butene-1 copolymers identified hereinafter as PE–II, PE–III, and PE–IV shows a melting range of from about 112 to about 128° C., with a peak at about 122–124° C. DSC analysis of the polypropylene used in the examples shows a melting range of about 147 to about 183° C., with peaks at about 155–158° C. and about 176° C., with a shoulder at about 173–175° C. on the latter peak.

EXAMPLE I

Physical blends of a homopolymer of polypropylene with one of a homopolymer of polyethylene or copolymers of ethylene and butene-1 were formed into films, molecularly oriented, fibrillated, and then tested for their abrasion characteristics.

The homopolymer of propylene, hereinafter described at PP, employed was formed using a diethylaluminum chloride-titanium trichloride catalyst and had a melt flow (ASTM D 1238–62T, Condition L) of 3 decigrams per minute, a density (ASTM D 1505–63T) of 0.905 gram per cubic centimeter, a melting range of from about 147 to about 183° C., and a crystallinity of 67 percent.

The homopolymer of ethylene, hereafter designated as PE–I, was made by the conventional high pressure process and had a melt index (ASTM D 1238–62T, Condition E) of 7.8 decigrams per minute, a density (ASTM D 1505–63T) of 0.917 gram per cubic centimeter, a melting point of 100° C. by DSC, and a crystallinity of 47 percent.

One ethylene/butene-1 copolymer, hereinafter referred to as PE–II, was made using a chromium oxide-silica catalyst, had a melt index (ASTM D 1238–62T, Condition E) of 0.3 decigram per minute, a density (ASTM D 1505–63T) of 0.95 gram per cubic centimeter, a melting point of 123° C. by DSC, and a crystallinity of 70 percent.

The second ethylene/butene-1 copolymer, hereinafter referred to as PE–III, was made with a chromium oxide-silica catalyst, had a melt index (ASTM D 1238–62T, Condition E) of 6.5 decigrams per minute, a density (ASTM D 1505–63T) of 0.95 gram per cubic centimeter, a melting point of 123° C. by DSC, and a crystallinity of 70 percent.

Blends of the polypropylene with any of the ethylene-containing polymers mentioned above were made by dry mixing pellets of the two polymers followed by feeding the mixture of pellets to a conventional blown tubing forming machine wherein a tube having a 2 mil wall thickness was formed from the pellet mixture.

The thus formed tube was flattened to form a film and this film was molecularly oriented using draw ratios set forth in the following Table I at film temperatures in the range of 140 to 165° C. Following this drawing operation at elevated temperatures the film was cooled rapidly such that the crystalline polymers remain oriented. The thus oriented film was then fibrillated using oscillating roll equipment at room temperature. The oscillating roll fibrillator is composed of two rolls in contact with one another, one of the rolls being adapted to vibrate in a substantially horizontal plane and in a direction substantially normal to the direction of movement of the film between the two rolls.

The fibrillated film was then tested for Accelerator abrasion resistance using a Standard American Association of Textile Chemists and Colorists test identified as AATC–93–1966T and using a tow of the fibrillated product 6 inches long and knotted in the middle. Flex abrasion resistance was also measured on the fibrillated product in accordance with ASTM D 1379–64. The results of these tests were as follows:

TABLE I

| Run | Blend composition, wt. percent | Draw ratio | Accelerotor abrasion weight loss, percent [1] | | Flex abrasion,[3] cycles to failure |
|---|---|---|---|---|---|
| | | | Before annealing | After annealing [2] | |
| 1 | 100 PP | 12/1 | 10 | 6.5 | 527 |
| 2 | 100 PP | 14/1 | 6.5 | 11.5 | 524 |
| 3 | 95 PP/5 PE–II | 12/1 | 2.4 | 0.3 | 1,465 |
| 4 | 95 PP/5 PE–III | 14/1 | 3.8 | 0.05 | 2,319 |
| 5 | 90 PP/10 PE–III | 12/1 | 1.9 | 0.2 | 2,235 |
| 6 | 90 PP/10 PE–III | 14/1 | 2.3 | 0.4 | 1,741 |
| 7 | 85 PP/15 PE–III | 12/1 | 1.3 | 0.3 | 1,596 |
| 8 | 85 PP/15 PE–III | 14/1 | 2.4 | 0.5 | 2,048 |
| 9 | 90 PP/10 PE–II | 9/1 | 3.1 | 0.1 | 707 |
| 10 | 85 PP/15 PE–II | 10/1 | 1.8 | 0.8 | 874 |
| 11 | 90 PP/10 PE–I | 14/1 | 8.9 | [4] 2.3 | 2,543 |
| 12 | 90 PP/10 PE–I | 16/1 | 10.4 | 0.8 | 729 |

[1] After 5 minutes at 4,000 r.p.m.; average for two specimens.
[2] Heated for 15 minutes at 137–148° C. in steam, zero tension.
[3] On annealed specimens.
[4] Average for three specimens.

The above data on Accelerotor abrasion show that very substantial increases in abrasion resistance are obtained by the heating (annealing) step of this invention when practiced on the polymer mixtures of Runs 3 through 12. The Accelerotor abrasion results for Runs 1 and 2 show that the heating step did not consistently affect the abrasion resistance of the polypropylene in the same manner and that even when affected favorably (Run 1), the increase in abrasion resistance was far less than the improvement obtained with the polymer mixtures of Runs 3 through 12. Runs 11 and 12 show that when using the low-density polyethylene, very significant improvements in abrasion resistance were effected with the annealing step, even though it was not quite as good an additive as the high-density ethylene copolymer.

The flex abrasion data show that by the use of the polymer mixtures and process of this invention, Runs 3 through 12, very substantial increases in the cycles to failure were obtained compared with the cycles to failure of polypropylene, Runs 1 and 2.

electron microscope micrographs were made of the vacuum-metallized sample at a magnification of 1000×. Observations on the micrographs are:

| Run | Blend | Annealing temp, °C. | Observations |
|---|---|---|---|
| 24 | 100 PP | None | Surface striated with some breaks parallel to the striae. |
| 25 | 100 PP | 100 | Same; striae slightly more prominent than in Run 24. |
| 26 | 100 PP | 130 | Same as in Run 25. |
| 27 | 90 PP/10 PE–IV | 100 | Do. |
| 28 | 90 PP/10 PE–IV | 130 | Striae have fused appearance, and circular raised craters of varying diameter that also have a fused appearance cover the surface of the fiber. |

EXAMPLE II

A blend containing 85 weight percent of the same polypropylene used in Example I and 15 weight percent polyethylene PE–III of Example I was prepared, made into film, and drawn at a draw ratio of 14/1 in the same manner as in Example I. Portions of this oriented but unfibrillated film were annealed at different temperatures in a dry air oven and the Accelerotor abrasion weight loss was determined:

| Run | Annealing temp., °C. | Accelerotor abrasion weight loss, percent |
|---|---|---|
| 13 | None | 2.27 |
| 14 | 105 | 2.31 |
| 15 | 110 | 2.11 |
| 16 | 115 | 2.28 |
| 17 | 120 | 2.50 |
| 18 | 125 | 2.45 |
| 19 | 130 | 1.51 |
| 20 | 135 | 1.73 |
| 21 | 140 | 1.90 |
| 22 | 145 | 1.70 |
| 23 | 150 | 2.84 |

It is apparent that the weight loss was high until Run 19 where the annealing temperature was higher than the entire melting range of the polyethylene, and that the weight loss increased again in Run 23 when the annealing temperature was within the melting range of the polypropylene.

EXAMPLE III

A sample of the PP/PE–II fiber of Run 10, Example I, was examined by X-ray diffraction before and after the annealing treatment of that example. Observations on the wide-angle scattering pattern before and after annealing are:

*Before.*—The polyethylene (110) and (200) diffraction maxima are superimposed on the polypropylene diffraction pattern, and show the same azimuthal width as do the polypropylene maxima. Hence the polyethylene crystallites are oriented with respect to the fiber axis to the same degree as are the polypropylene crystallites (c axis orientation in both cases).

*After.*—The azimuthal width of the polypropylene diffraction maxima increased slightly, whereas that of the polyethylene maxima increased by a factor of 10 to 20. This indicates that the polypropylene crystallites remained substantially oriented as in "*Before*" above while the polyethylene crystallites were essentially unoriented.

EXAMPLE IV

Split-film fibers were prepared in the same manner as in Example I using a draw ratio of 10/1, and slitting the drawn film to a width of 2.85 inches before fibrillation. The ethylene/butene-1 copolymer used in the blend had the same density, melting point, and crystallinity as those used in Example I and had a melt index of 9.5 decigrams per minute. This copolymer is hereinafter referred to as PE–IV. The fibrillated product was annealed 30 minutes in steam at the indicated temperatures, and Stereoscan It is apparent that annealing at temperatures of 100° C. and 130° C. had little if any effect on the appearance of the polypropylene fibers, that annealing at a temperature of 100° C. had little if any effect on the appearance of the blend fibers, and that annealing at a temperature of 130° C.—i.e., above the melting range of the ethylene/butene-1 copolymer—had a marked effect on the appearance of the blend fibers. The "cratering" phenomenon was peculiar to run 28 and completely absent from runs 24–27.

Reasonable variations and modifications are possible within the scope of this disclosure without departing from the spirit and scope thereof.

That which is claimed is:

1. A method of producing an oriented article having reduced tendency to fibrillate comprising:
    (1) mixing from 55 to 99 weight percent of a first polymer component and
    (2) from 1 to 45 weight percent of a second component, said percentages being based on the total of weight of said components (1) and (2), said components (1) and (2) each having a crystallinity of at least 25 percent and a relatively distinct melting point range and being composed of one of homopolymers or copolymers formed from 1-olefins having from 2 to 8 carbon atoms per molecule, inclusive, polyamides and polyesters, said component (1) being further characterized by having a melting point of at least 5° C. above the melting point of said component (2);
    melt extruding said thus formed mixture to give an extrudate;
    drawing said extrudate, such that the ratio of stretched to unstretched length is within the range of 2:1 to 25:1, at a temperature no higher than the melting point of said component (1) to thus molecularly orient said extrudate;
    cooling said thus oriented extrudate;
    and heating said thus cooled oriented extrudate to a tempertaure below the melting point of said component (1) and above the melting point of said component (2) for a period of time sufficient to disorient the lower melting component.

2. A method according to claim 1 wherein said oriented extrudate is a film and said film is fibrillated prior to said heating.

3. A method according to claim 1 wherein said extrudate is a ribbon.

4. The method according to claim 1 wherein said 1-olefins are selected from the group consisting of ethylene, propylene, and butene-1.

5. The method according to claim 1 wherein said first component is formed from a homopolymer of propylene and said second component is formed from one of a homoplymer of ethylene and a copolymer of ethylene and butene-1 and said extrudate is heated for from about 5 seconds to about 20 minutes.

6. The method according to claim 5 wherein the extrudate is provided by forming a physical mixture of said polymer components, melt extruding said mixture into film form, molecularly orienting said film by plastically stretching same substantially parallel to its longitudinal axis, and passing the oriented film between at least one pair of oscillating rollers, said rollers being oscillated in a direction substantially parallel to their axes of rotation and also substantially perpendicular to the longitudinal axis of said oriented film passing there between.

References Cited

UNITED STATES PATENTS

| | | | |
|---|---|---|---|
| 3,066,006 | 11/1962 | Sonnino | 264(digest) |
| 3,118,001 | 1/1964 | Breen | 264—171X |
| 3,217,074 | 11/1965 | Gould | 264—171X |
| 3,336,174 | 8/1967 | Dyer | 264—147X |
| 3,416,714 | 12/1968 | Skinner | 28—1X |
| 3,454,460 | 7/1969 | Bosley | 264—171X |

ROBERT F. WHITE, Primary Examiner

R. R. KUCIA, Assistant Examiner

U.S. Cl. X.R.

264—171, 234

Disclaimer and Dedication 3,548,048.—*James K. Hughes* and *Jake E. Williams*, Bartlesville, Okla. METHOD OF PRODUCING POLYMERIC ARTICLES RESISTANT TO FIBRILLATION. Patent dated Dec. 15, 1970. Disclaimer and dedication filed Dec. 28, 1971, by the assignee, *Phillips Petroleum Company*.

Hereby disclaims said patent and dedicates to the Public the remaining term of said patent.

[*Official Gazette April 11, 1972.*]